US009983006B2

(12) United States Patent
Deppe-Reibold et al.

(10) Patent No.: US 9,983,006 B2
(45) Date of Patent: May 29, 2018

(54) FIBER OPTIC SYSTEM AND METHOD FOR REDUCING BIAS ERRORS IN SUCH A FIBER OPTIC SYSTEM

(71) Applicant: NORTHROP GRUMMAN LITEF GMBH, Freiburg Im Breisgau (DE)

(72) Inventors: Olaf Deppe-Reibold, Emmendingen (DE); Günter Spahlinger, Stuttgart (DE)

(73) Assignee: Northrop Grumman Litef GmbH (DE)

( * ) Notice: Subject to any disclaimer, the term of this patent is extended or adjusted under 35 U.S.C. 154(b) by 0 days. days.

(21) Appl. No.: 15/140,012

(22) Filed: Apr. 27, 2016

(65) Prior Publication Data

US 2016/0320188 A1 Nov. 3, 2016

(30) Foreign Application Priority Data

Apr. 28, 2015 (DE) .................. 10 2015 106 550

(51) Int. Cl.
*G01C 19/72* (2006.01)
*G02F 1/225* (2006.01)
(52) U.S. Cl.
CPC .......... *G01C 19/721* (2013.01); *G01C 19/72* (2013.01); *G02F 1/2252* (2013.01)

(58) Field of Classification Search
CPC ...... G01C 19/721; G01C 19/72; G02F 1/2252
See application file for complete search history.

(56) References Cited

U.S. PATENT DOCUMENTS

2012/0199722 A1* 8/2012 Voigt .................. H04B 10/572
250/201.1

* cited by examiner

*Primary Examiner* — Hwa Lee
(74) *Attorney, Agent, or Firm* — Tarolli, Sundheim, Covell & Tummino LLP (57) ABSTRACT

The bias error in a fiber optic system comprising a fiber optic gyroscope can be determined by determining of at least two different values for rotation rate by an evaluation unit of the fiber optic gyroscope for almost constant rotation rate applied to the fiber optic gyroscope and/or can be reduced by a linear combination of the at least two different values for the rotation rate. A fiber optic system that is suitable for carrying out this method comprises besides the fiber optic gyroscope a control device that is configured to control at least one element of the fiber optic gyroscope such that at least two different values for the rotation rate are determined by the evaluation unit of the fiber optic gyroscope for almost constant rotation rate applied to the fiber optic gyroscope.

15 Claims, 4 Drawing Sheets

FIBER OPTIC SYSTEM AND METHOD FOR REDUCING BIAS ERRORS IN SUCH A FIBER OPTIC SYSTEM

The invention concerns a fiber optic system as well as a method for reducing bias errors in such a fiber optic system.

Sensors for measuring angular velocities that are used for example in navigation systems or systems for analysis or control of movements or of the position of an object may comprise instead of mechanical gyroscopes also interferometric fiber gyroscopes (also called fiber optic gyroscopes or fiber gyroscope). These analyze the interference of two light waves running in opposite directions in a coiled optical wave guide, the interference resulting from different transit times of the oppositely running wave trains and the therefrom resulting phase difference, which is caused by a rotation of the optical wave guide around an axis perpendicular to the plane in which the wave guide is arranged. The amount of change in intensity of the detected light, which is described by an interferometer characteristic, is a measure for the rotation rate applied to the gyroscope.

The interferometer characteristic characterizes, hence, the dependency of the light intensity, which is to serve as observation parameter for determining the rotation, from the phase difference of the two light waves. Often, the working point of the fiber gyroscope on the cosine-formed interferometer characteristic is adjusted such that it is located in a point of a maximal gradient of the characteristic, i.e. approximately at a half of maximal light intensity. This should ensure that already for a small rotational movement a maximal sensitivity of the interferometer is guaranteed.

Such a fiber optic gyroscope comprises in principle a light source, which generates the circulating light waves or light beams, a coiled optical wave guide (e.g. a fiber coil), an optical device for irradiating the oppositely running light beams into both ends of the coiled optical wave guide and for receiving of the oppositely running light beams that have passed through the coiled optical waveguide (also called multifunctional integrated optical chip (MIOC)), as well as a detector that determines the interference of the oppositely running wave trains. Additionally, a polarizer that polarizes the light waves emitted from the light source and/or an optical coupler that guides the light beams either from the light source to the optical device (to the coiled optical wave guide) or from the optical device (from the coiled optical wave guide) to the detector are present. Further, a fiber gyroscope comprises an analog amplifier as well as an evaluation unit.

If a closed loop method for operating the gyroscope is used, the evaluation unit comprises an analog/digital converter, a control loop that generates a phase reset signal, and a digital/analog converter that provides a modulation signal obtained from the phase reset signal to a phase modulator in the optical device such that the phase of the supplied light waves can be modulated such that the intensity of the detected light remains constant, i.e. that the working point of the interferometer is maintained. Here, the value of the necessary phase reset signal is a measure for the rotation rate applied to the gyroscope.

A bias error may occur in such a fiberoptic gyroscope, which manifests itself as zero point error of the gyroscope. Due to this, also in a rest position, i.e. while no real mechanic intrinsic rotation rate is applied, a rotation rate larger than zero is output or determined. This may be caused by different effects. A known mechanism is the so-called amplitude modulation at the optical device, which is a parasitic effect of the phase modulators present on the optical device. These should ideally only modulate the phase of the light waves, but in fact also modify to a small degree the amplitude and hence the intensity of the light. In addition, the electrical modulation signal that is supplied to the optical device may leak into the detector path.

An object of the present invention is to provide a method for reduction of this bias error in a fiber optic system as well as a fiber optic system that is configured to carry out such a method.

This object is solved by the subject-matter of the independent claims. Preferred embodiments are defined in the dependent claims.

A fiber optic system according to the invention comprises a fiber optic gyroscope comprising a light source, a fiber coil, an optical device having a phase modulator, a photo detector, an amplifier and an evaluation unit as well as a control device. The optical device is configured to split a light beam coming from the light source by means of beam splitting and to modulate the phase of at least one of the generated light beams to adjust, hence, a current working point of the fiber optic gyroscope. The optical device is further configured to irradiate the generated light beams in directions opposite to each other into the fiber coil and to unify the light beams leaving the fiber coil. The photo detector is configured to generate from an interference signal that is generated due to the reunification of the light beams a signal corresponding to the light intensity of the interference signal, while the amplifier is configured to amplify the signal generated in the photo detector. The evaluation unit is configured to generate by means of the signal generated by the amplifier a modulation signal that controls the phase modulator such that a reset of the interferometer signal according to the current working point of the fiber optic gyroscope is achieved or such that a predetermined value is adjusted as current working point of the fiber optic gyroscope. Moreover, the evaluation unit is configured to determine on the basis of the modulation signal a rotation rate of the fiber optic gyroscope. The control device is configured to control at least one element of the fiber optic gyroscope such that at least two different values for the rotation rate are determined by the evaluation unit for almost constant rotation rate applied to the fiber optic gyroscope.

By a comparison of the at least two determined values for the rotation rate the bias error of the fiber optic gyroscope can be determined. Alternatively or additionally the bias error may be reduced by a linear combination of the at least two determined values for the rotation rate and a corrected value for the rotation rate applied to the fiber optic gyroscope can be obtained. For these purposes, the fiber optic system may further comprise a processing unit.

For determining the at least two different values for the rotation rate for almost constant rotation rate applied to the fiber optic gyroscope at least two different working points of the fiber optic gyroscope may be adjusted at the very same interferometer characteristic of the fiber optic gyroscope. Alternatively, at least two different interferometer characteristics of the fiber optic gyroscope may be generated by a change of the amplification of the control path outside of the evaluation unit.

By means of the method according to the invention and the fiber optic system according to the invention the bias error can be reduced independent of the age of the fiber optic gyroscopes and other external influences, as the error is compensated continuously based on the at least two different determined values for the rotation rate. Then, for example aging of components of the fiber optic gyroscope or changes in the ambient temperature have a substantially smaller influence on the rotation rates determined by the fiber optic system if compared to systems in which the bias error is only determined in one calibration process and afterwards used as a constant value in generating the corrected rotation rate. Embodiments of the present invention are explained in what follows based on the figures, wherein same elements are indicated by the same reference signs.

Figure 1:
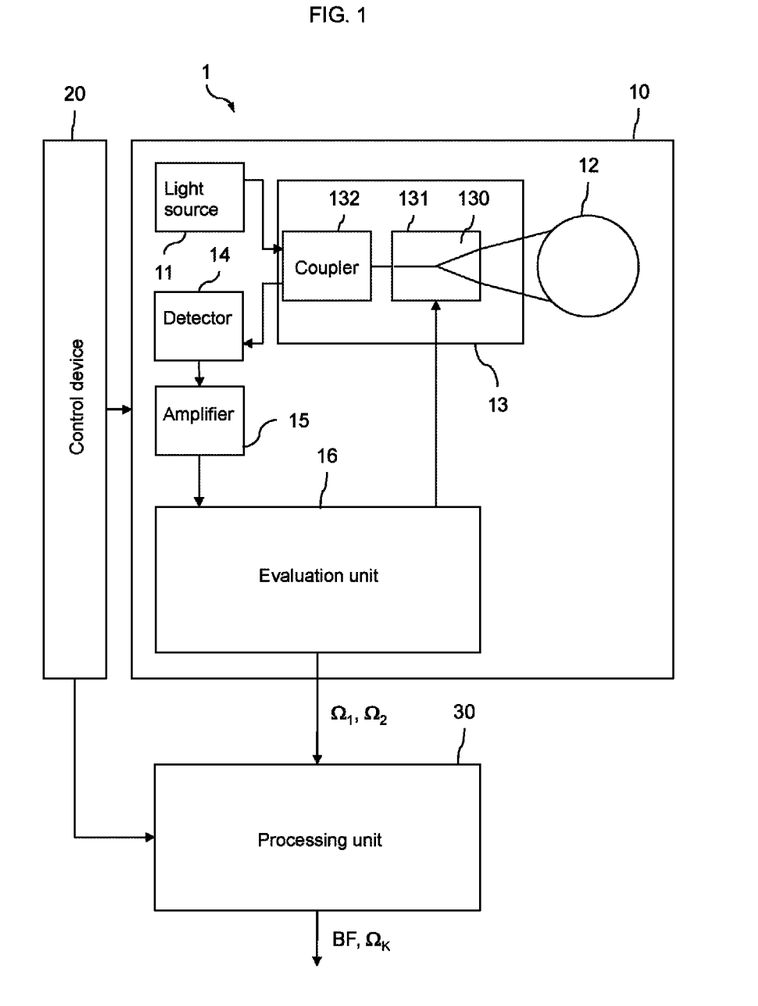
FIG. 1 shows a schematic representation of a fiber optic system according to the invention in an exemplary form.

The fiber optic system 1 illustrated in FIG. 1 comprises a fiber optic gyroscope 10, a control device 20, and a processing unit 30. The fiber optic gyroscope 10 comprises a light source 11, a fiber coil 12, an optical device 13, a photo detector 14, an amplifier 15, and an evaluation unit 16. The light source 11 is configured to emit light of a specific wave length and a specific light power. The fiber coil 12 substantially comprises an optical fiber coiled up to a coil. The optical device 13 comprises a phase modulator 130 and is configured to split a light beam coming from the light source 11 by means of beam splitting and to change the phase of at least one of the generated light beams. The light beams generated and modulated such are then irradiated into the fiber coil 12 in directions opposite with respect to each other. Moreover, the optical device 13 is configured to unify the light beams leaving the fiber coil 12 and to generate an interference signal. This interference signal is converted by the photo detector 14 into an electrical signal that comprises information about the light intensity of the interference signal. The generated electrical signal is analog amplified in the amplifier 15 and supplied to the evaluation unit 16. The optical device 13 may for example comprise a multifunctional integrated optical chip (MIOC) 131 and a coupler 132, wherein the MIOC 131 realizes beam splitting and beam unification and contains the phase modulator 130, and wherein the coupler 132 is configured to guide the light beams from the light source 11 to the MIOC 131 and from the MIOC 131 to the photo detector 14. The separate functionalities of the optical device 13 may also be realized in one element or in other elements that are not indicated here, wherein the functionalities may be divided between the different elements in arbitrary manner.

Phase modulation set by the phase modulator 130 determines the current working point of the fiber optic gyroscope 10 on an interferometer characteristic of the fiber optic gyroscope 10, the interferometer characteristic being defined by parameters of the components of the fiber optic gyroscope 10. Such parameters that determine the interferometer characteristic are for example the light power of the light source 11, an amplitude modulation of the used light, which is caused by the optical device 13 or other components of the fiber optic gyroscope 10, the light sensitivity of the photo detector 14 or the analog amplification of the amplifier 15. By means of the interferometer characteristic a rotation rate applied to the fiber optic gyroscope 10 can be determined based on the signal generated by the amplifier in the evaluation unit 16. In closed loop operation of the fiber optic gyroscope 10 the evaluation unit 16 comprises a control loop that generates a modulation signal that is suitable for controlling the phase modulation 130 such that a reset of the interference signal according to the current working point of the fiber optic gyroscope 10 can be achieved. Based on the amount of deviation of the signal generated by the amplifier and of the signal predetermined by the working point of the fiber optic gyroscope 10 or, respectively, based on the value of the necessary reset signal the evaluation unit 16 determines the rotation rate that is applied to the fiber optic gyroscope 10. In addition, by means of a modified modulation signal also a new current working point of the fiber optic gyroscope 10 may be set.

The fiber optic gyroscope 10 has a bias error BF, whose origin has already been described above. The size of the bias error BF depends on the position of the working points of the fiber optic gyroscope on the interferometer characteristic of the fiber optic gyroscope as well as on the characteristic values of the interferometer characteristic of the fiber optic gyroscope as such, wherein in particular the gradient of the characteristic at the working point, i.e. the size or amplification of a signal deviating from the working point of the characteristic, matters.

Figure 2:
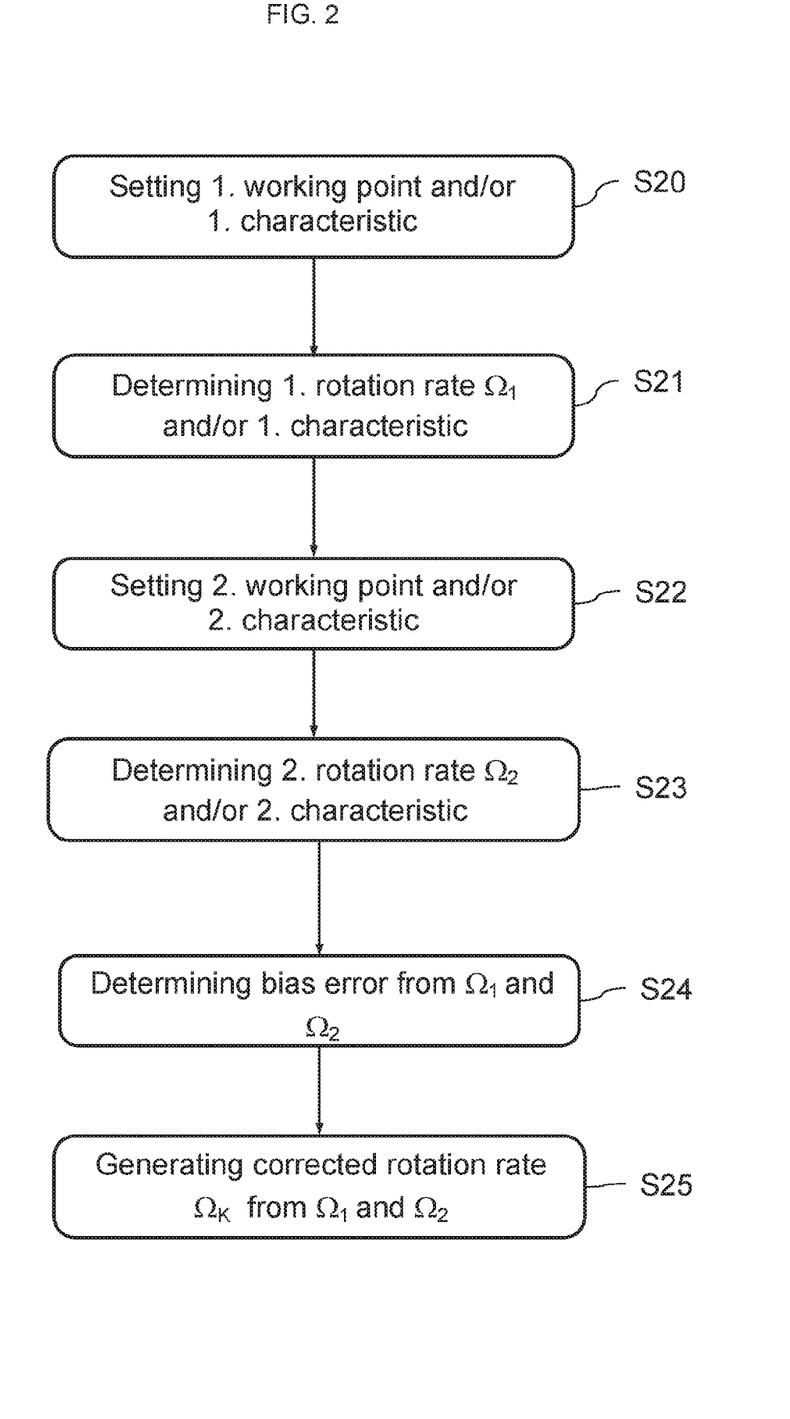
FIG. 2 shows a schematic representation of a method for operating a fiber optic system according to the invention in an exemplary form.

These features of the bias error BF are used in the method according to the invention, which is illustrated in FIG. 2 in an exemplary form. First, at step S20 a first working point on a given interferometer characteristic and/or a first interferometer characteristic of the fiber optic gyroscope 10 are adjusted by means of a corresponding control of the components of the fiber optic gyroscope 10. The control is realized by the control device 20 as illustrated in FIG. 1. For example, the control device 20 may control the evaluation unit 16 such that by means of the modulation signal a first working point is set on the interferometer characteristic of the fiber optic gyroscope 10. Alternatively, the control device may control other components of the fiber optic gyroscope 10, e.g. the light source 11 or the amplifier 15, such that a first interferometer characteristic of the fiber optic gyroscope 10 is obtained.

For this first working point or, respectively, for this first interferometer characteristic at step S21 a first rotation rate $\Omega_1$ is determined by the evaluation unit 16 for the rotation rate $\Omega$ that is actually applied to the fiber optic gyroscope 10.

Then, the control device 20 controls the components of the fiber optic gyroscope 10 such that at step S22 a second working point is set at the given interferometer characteristic of the fiber optic gyroscope 10 or that a second interferometer characteristic of the fiber optic gyroscope 10 is obtained. It is also possible to newly adjust the working point, i.e. the phase modulation generated by the phase modulation 130, as well as the interferometer characteristic.

At step S23 for this second working point or, respectively, for the second interferometer characteristic a second rotation rate $\Omega_2$ is determined by the evaluation unit 16 for the rotation rate $\Omega$ that is actually applied to the fiber optic gyroscope 10.

As the change of working point or, respectively, of the interferometer characteristic as well as the determination of the rotation rate by the evaluation unit are carried out in a very short time period, while the rotation rate $\Omega$ applied to the fiber optic gyroscope 10 changes only comparatively slow, the first determined rotation rate $\Omega_1$ as well as the second determined rotation rate $\Omega_2$ correspond to almost identical rotation rates $\Omega$ that are actually applied to the fiber optic gyroscope 10. This means that the difference between the two determined rotation rates $\Omega_1$ and $\Omega_2$ is caused by different sizes of the bias error for the underlying working points or, respectively, interferometer characteristics.

Due to this, at step S24 it is possible to determine by a comparison of the two determined rotation rates $\Omega_1$ and $\Omega_2$ or by further processing the two determined rotation rates $\Omega_1$ and $\Omega_2$ the bias error BF of the fiber optic gyroscope 10 for a specific working point on a specific interferometer characteristic. Moreover, at step S25 a corrected value SIT (for the rotation rate can be generated by a linear combination of the two determined rotation rates $\Omega_1$ and $\Omega_2$ that corresponds to the rotation rate $\Omega$ that is actually applied to the fiber optic gyroscope 10 and that has a reduced bias error. Ideally, the bias error BF may even be compensated or eliminated totally. Steps S24 and S25 are carried out by the processing unit 30 illustrated in FIG. 1.

FIG. 2 only illustrates exemplary the use of two different working points on a given interferometer characteristic of the fiber optic gyroscope or, respectively, the use of two different interferometer characteristic of the fiber optic gyroscope. However, also further working points or, respectively, further interferometer characteristic may be used and further rotation rates $\Omega_3$ to $\Omega_n$ may be obtained for these. Also the use of a continuum of working points and interferometer characteristics in a respective range of parameters as well as the corresponding determination of continuous values $\Omega_i$ for the rotation rate is possible. Then, between steps S23 and S24 further steps for setting a working point and/or obtaining an interferometer characteristic as well as for determining a rotation rate for the set working point or the obtained interferometer characteristic would be carried out. Accordingly, the steps S24 and S25 would then refer to more than two determined values for the rotation rate such that the size of the bias error BF and the corrected value $\Omega_K$ for the rotation rate are determined or generated from several or all of the determined rotation rate values $\Omega_i$.

In addition, also the steps S20 and S21 as well as S22 and S23 may be carried out several times after each other such that several values for the first rotation rate $\Omega_1$ and several values for the second rotation rate $\Omega_2$ are determined, from which then the mean is taken to obtain the rotation rate values $\Omega_1$ and $\Omega_2$ that are used in steps S24 and S25. In this process, the steps for setting the different working points or for obtaining the different interferometer characteristics, and for determining the corresponding associated rotation rate values $\Omega_i$ should be carried out alternating or—for more than two working points or interferometer characteristics—in a predetermined sequence that allows relating of a specific determined rotation rate value $\Omega_i$ to a specific working point or a specific interferometer characteristic.

Step S24 is optional. It may for example be carried out only during a calibration or test phase of the fiber optic gyroscope to judge the quality of the fiber optic gyroscope based on predetermined limits for the bias error. The determined bias error BF may then be stored and/or used for further processing steps.

As examples for the linear combination carried out at step S25 of the determined rotation rate values $\Omega_i$ only forming of (weighted) differences or averages has been indicated here. However, also other different linear combinations are possible.

The control device 20 and the processing device 30 that are illustrated in FIG. 1 as separate components of the fiber optic system 1 may also—at least partially—be integrated in components of the fiber optic gyroscope 10. For example, the functionalities of the control device 20 and/or parts of the processing device 30 may be realized within the evaluation unit 16. On the other hand, it is also possible that the control device 20 and/or the processing device 30 or at least parts of these components are spatially separately arranged from the components of the fiber optic gyroscope 10, for example in a computer.

Figure 3:
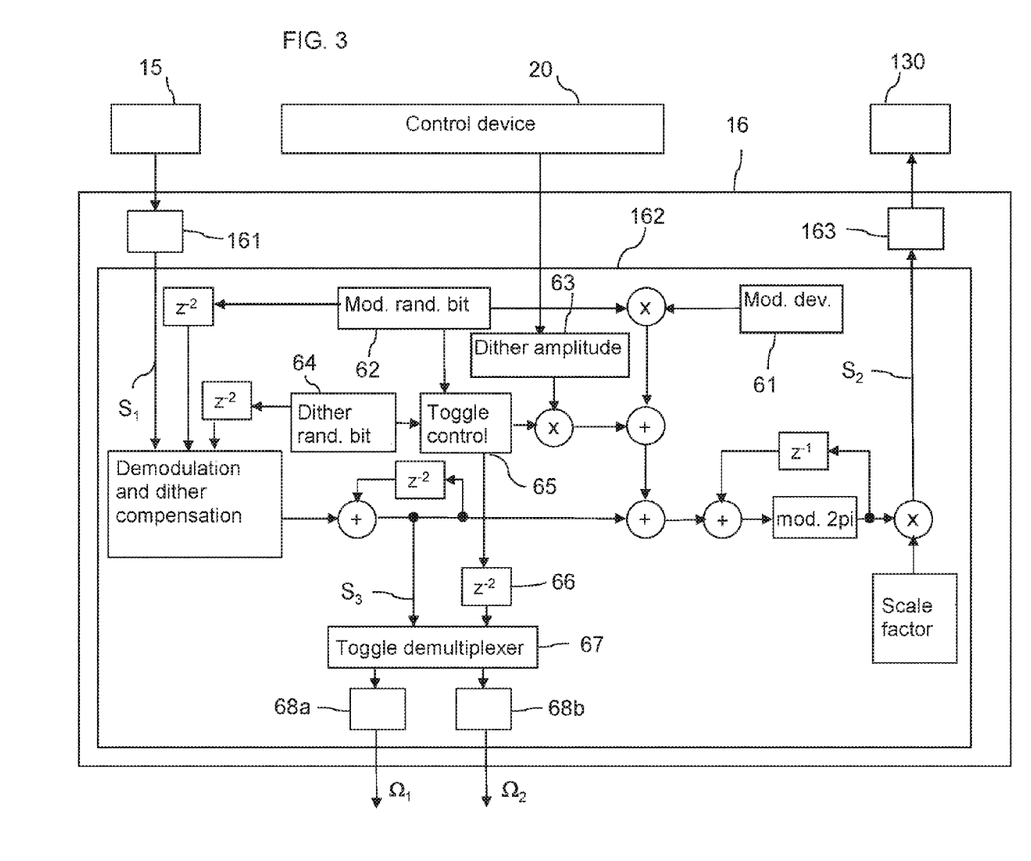
FIG. 3 shows a schematic representation of a part of a fiber optic system according to a first embodiment of the invention.

FIG. 3 shows a schematic representation of the evaluation unit 16 of a first embodiment of the fiber optic system according to the invention as well as some further components of the fiber optic system for better understanding. Here, the evaluation unit 16 of the fiber optic gyroscope 10 comprises an analog/digital converter 161, which converts the analog signal generated by the amplifier 15 into a first digital signal $S_1$, a control loop 162, which generates based on the first digital signal $S_1$ a second digital signal $S_2$ and a third digital signal $S_3$, and a digital/analog converter 163, which converts the second digital $S_2$ in an analog modulation signal that controls the phase modulator 130 such that a reset of the interference signal according to the current working point of the fiber optic gyroscope 10 or setting of a new working point of the fiber optic gyroscope 10 on the interferometer characteristic of the fiber optic gyroscope 10 can be achieved.

The control loop 162 comprises different components as for example adders, multipliers, and dead time elements that serve for a corresponding processing of the applied signals and to some of which signals from supporting control loops are supplied, which are not shown in the control loop 162 illustrated in FIG. 3 for better overview and visualization of the components necessary for implementation of the method according to the invention, which are, however, known to the person skilled in the art. The control loop 162 comprises components for demodulating and dither compensation in the first digital signal $S_1$, a unit 61 for generating a modulation deviation, a unit 62 for generating a modulation-random-bit, a unit 63 for generating a dither amplitude, as well as a unit 64 for generating a dither-random-bit. In addition, the control loop 162 comprises components for generating the second digital signal $S_2$ and the third digital signal $S_3$. The third digital signal $S_3$ corresponds to the rotation rate value $\Omega_i$ determined in the corresponding work cycle. The control loop 162 of the first embodiment of the fiber optic system according to the invention comprises further a toggle control unit 65, a dead time element 66, and a toggle demultiplexer unit 67.

The unit 61 for generating the modulation deviation may for example generate a modulation deviation of $\pi/2$, to which one of the generally used working points on the interferometer characteristic corresponds.

The unit 63 for generating the dither amplitude can be controlled by the control device 20 by means of a control signal such that it generates at least two different values for the dither amplitude. For example, a first amplitude having the value $(\pi/2)/256$, which corresponds to the standard amplitude, and a second, strongly increased amplitude having for example the value of $70 \cdot (\pi/2)/256$ may be set. As the dither signal with the adjusted dither amplitude serves for generating the second digital signal $S_2$, which corresponds after digital/analog conversion to the modulation signal, thus, different working points of the fiber optic gyroscope 10 on the interferometer characteristic of the fiber optic gyroscope 10 can be set.

To be able to evaluate the rotation rate information of the different working points of the fiber optic gyroscope 10 separately and in relation to the corresponding working points, the modulation-random-bit and the dither-random-bit are interrelated in the toggle control unit 65 by an XOR logic. This ensures that a series of working points can be set that have either a sequence that is strictly alternating from cycle to cycle or that is predetermined. Further, it is ensured that rotation rate values $\Omega_i$ can be generated and then related to the respectively corresponding working point. To this end, by using the XOR logic of the modulation-random-bit and the dither-random-bit it is determined on which of the predetermined levels the working point will be located in the next cycle. If in a comparison of this level with the working point level of the previous modulation cycle identity is determined, an alternating sequence of working points can be achieved by inverting the dither-random-bit. If more than two different working points are to be set, the toggle control unit 65 is formed accordingly.

Using the signal of the toggle control unit 65 a toggle demultiplexer 67 is operated after the signal passed a corresponding dead time element 66 (in FIG. 3 a $z^{-2}$ dead time element is illustrated, wherein the number of dead times is determined by the real implementation of such a system and e.g. defined by the computation time of the evaluation unit and by the times that are necessary for reading and writing of the converters), wherein the toggle demultiplexer 67 relates the rotation rate values $\Omega_i$ determined in a specific cycle to a specific working point level. The rotation rate values $\Omega_i$ or the corresponding third digital signals $S_3$ that are related to the same working point level are averaged in a corresponding integrator 68 and output as rotation rate values. In FIG. 3 the control loop for using two different working points is illustrated such that two integrators 68a and 68b for generating the averaged first rotation rate $\Omega_1$ and the averaged second rotation rate $\Omega_2$ are illustrated. The first rotation rate $\Omega_1$ and the second rotation rate $\Omega_2$ are then used in the processing unit 30 for determining the bias error BF and/or for generating the corrected rotation rate $\Omega_K$ as was explained with reference to FIG. 1.

FIG. 3 illustrates that the unit 63 for generating the dither amplitude is controlled by the control device 20 such that one or several different dither amplitudes can be generated wherein, if a constant dither amplitude is used, the sign of the dither amplitude is variable. Alternatively or additionally the control device may also control the unit 61 for generating the modulation deviation such that for example in addition to the usually used modulation deviation of $\pi/2$ also a modulation deviation of $\pi/4$ or of $3/4\cdot\pi$ can be generated.

The dead time elements may be adapted to the number of working points and the working speed of the components comprised in the fiber optic gyroscope 10. In this manner, also retardations other than the illustrated retardation of two cycles can be realized by the corresponding dead time elements.

Figure 4:
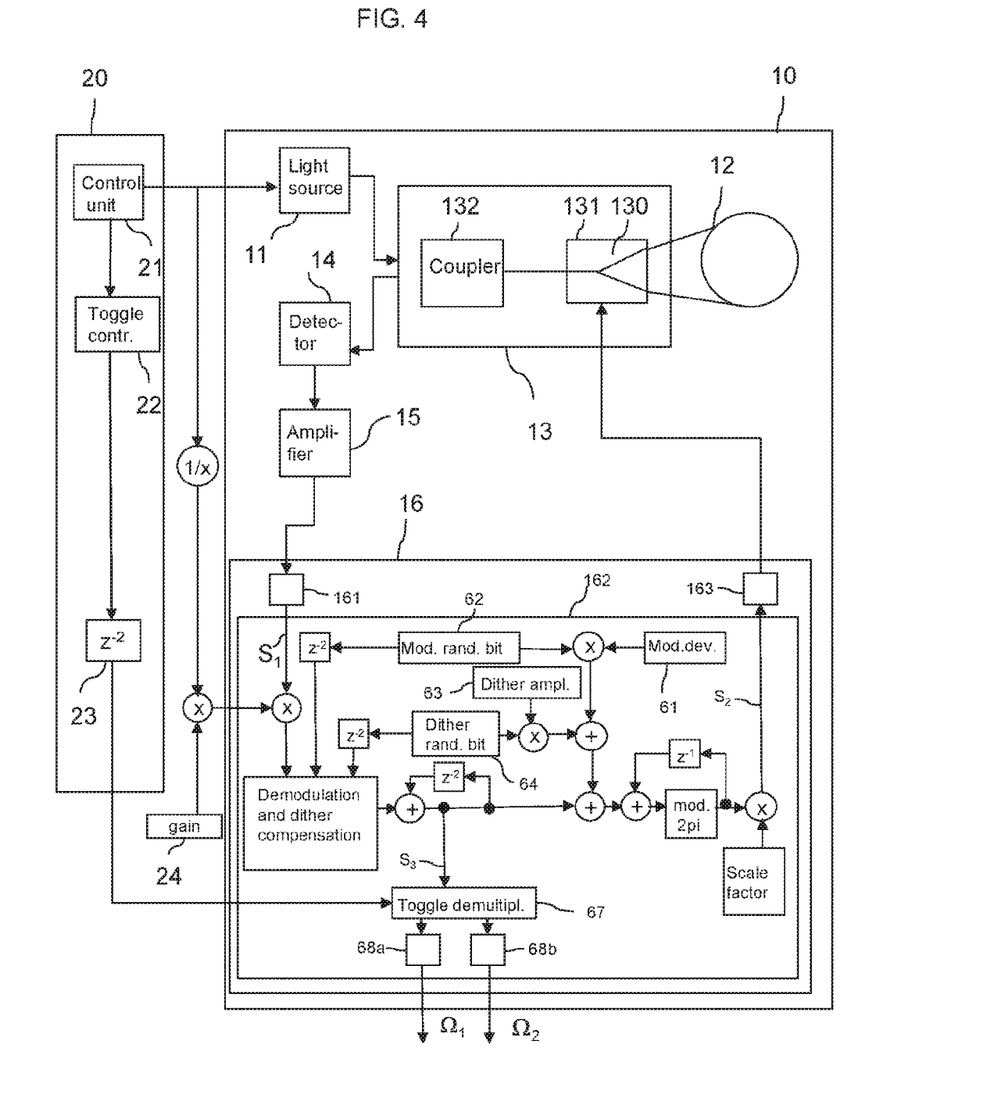
FIG. 4 shows a schematic representation of a fiber optic system according to a second embodiment of the invention.

FIG. 4 illustrates a second embodiment of the fiber optic system according to the invention schematically. Here, in contrast to the first embodiment not components of the evaluation unit 16 are controlled such that different working points on the very same interferometer characteristic of the fiber optic gyroscope 10 are set and hence different rotation rate values for almost constant rotation rate applied to the fiber optic gyroscope 10 are determined, but different interferometer characteristics are generated for the fiber optic gyroscope 10 and by means of these interferometer characteristics different rotation rate values for an almost constant rotation rate applied to the fiber optic gyroscope 10 are determined. To this end, by means of the control device 20 at least one element of the group comprising the light source 11, the optical device 13, the photo detector 14, and the amplifier 15 are controlled, due to which a modulation of the amplification or the intensity of the interference signal or the signal generated therefrom in the photo detector 14 is obtained. In order to keep the overall amplification of the control loop constant it is necessary in this method to compensate the modulation of the amplification of the analog path, i.e. between digital/analog and analog/digital converter by an inverse modulation of the digital gain 24.

This path for controlling the digital gain 24 is also illustrated in FIG. 4. The value for the digital gain 24 may either be the result of a supporting control loop, which determines continuously the correct value, or may be defined by configuration constants. The evaluation unit 16 comprises similar components as in the first embodiment with few modifications that will be explained in what follows.

FIG. 4 illustrates for example the control of the light source 11 by the control device 20. Here, the light source current may be modulated such that two different light powers of the light source and hence two different interferometer characteristics of the fiber optic gyroscope 10 are obtained. Due to this, for the same phase modulation by the phase modulator 130 a first rotation rate $\Omega_1$ and a second rotation rate $\Omega_2$ are generated by the evaluation unit 16. Also in this case several different values for the light source current and hence several different interferometer characteristics and corresponding rotation rate values $\Omega_1$ to $\Omega_n$ or a quasi-continuous range of light source current values and resulting rotation rate values is possible.

To adjust the different light source current values and to relate the determined third digital signal $S_3$ or, respectively, the determined rotation rate values to a specific interferometer characteristic, the control device 20 comprises besides a control unit 21, which provides a signal for adjusting the respective light source current in the light source 11, a toggle control unit 22 and a dead time element 23. The toggle control unit 22 serves for adjusting a predetermined sequence of interferometer characteristics of the fiber optic gyroscope 10 to be obtained, similarly as already described with respect to the first embodiment of FIG. 3 with respect to the adjustment of a predetermined sequence of working points that are to be set.

Using the signal from the toggle control unit 22 a toggle demultiplexer 67 in the evaluation unit 16 is operated after the signal has passed a dead time element 23, which is adapted to the implementation. Here, the toggle demultiplexer 67 relates the determined rotation rate values $\Omega_i$ to a specific interferometer characteristic. The rotation rate values $\Omega_i$ that are related to the same interferometer characteristic or the corresponding third digital signals $S_3$ are averaged in a corresponding integrator 68 and output as rotation rate values. FIG. 4 illustrates the control loop for the use of two different interferometer characteristics such that two integrators 68a and 68b for generating the averaged first rotation rate $\Omega_1$ and the averaged second rotation rate $\Omega_2$ are illustrated. The first rotation rate $\Omega_1$ and the second rotation rate $\Omega_2$ are then used in the processing unit 30 for determining the bias error BF and/or for generating the corrected rotation rate $\Omega_K$ as has been explained with respect to FIG. 1.

In contrast to the control loop 162 of the first embodiment illustrated in FIG. 3, the control loop 162 of the second embodiment does not comprise an interrelation of the modulation-random-bit and the dither-random-bit by a toggle control unit. Due to this, the dither-random-bit and the dither amplitude are interrelated without taking account of the modulation-random-bit. Further, neither the unit 61 for generating the modulation deviation nor the unit 63 for generating the dither amplitude are controlled by the control device 20 such that different working points of the fiber optic gyroscope are generated by a change of the set phase modulation.

FIG. 4 illustrates that the light source 11 is controlled by the control device 20 such that two or more different interferometer characteristics are generated. Alternatively, the control device 20 may for example also control the analog amplification by the amplifier 15 such that for example in addition to a usually used interferometer characteristic of the fiber optic gyroscope 10, which is obtained by a first amplification of the signal generated by the photo detector 14, also a second interferometer characteristic of the fiber optic gyroscope 10 may be used that is obtained by a second amplification of the signal generated by the photo detector 14.

Also an alternative or additional control of other components of the fiber optic gyroscope 10 is possible.

The combination of the first and the second embodiment of the fiber optic system with the method for operating the fiber optic system is also conceivable. Stated differently, components of the control loop 162 for setting different working points of the fiber optic gyroscope 10 as well as other components of the fiber optic gyroscope 10 for obtaining different interferometer characteristics of the fiber optic gyroscope 10 may be controlled simultaneously or in a time shifted manner.

The invention claimed is:

1. A fiber optic system comprising:
   a fiber optic gyroscope comprising:
      a light source,
      a fiber coil,
      an optical device comprising:
         a multifunctional integrated optical chip (MIOC) that includes a phase modulator, the MIOC splits a light beam coming from the light source into generated light beams and the phase modulator modulates the phase of at least one of the generated light beams to adjust a current working point of the fiber optic gyroscope, the MIOC irradiates the generated light beams in directions opposite to each other into the fiber coil and unifies the light beams leaving the fiber coil,
      a photo detector to generate a signal corresponding to the light intensity of an interference signal generated due to the reunification of the light beams,
      an amplifier to amplify the signal generated in the photo detector, and
      an evaluation unit that includes a control loop to generate by means of the signals generated by the amplifier a modulation signal, which controls the phase modulator such that a reset of the interference signal according to the current working point of the fiber optic gyroscope is obtained or that a predetermined value is set as the current working point of the fiber optic gyroscope, and to determine based on the modulation signal a rotation rate of the fiber optic gyroscope,
   a control device to control at least one element of the fiber optic gyroscope such that at least two different values ($\Omega_1$, $\Omega_2$) for the rotation rate are determined by the evaluation unit for almost constant rotation rate applied to the fiber optic gyroscope, and
   a processing unit to compare the at least two different values for the rotation rate to determine a bias error (BF) used to correct the rotation rate of the fiber optic gyroscope based on the modulation signal,
   wherein the evaluation unit includes a toggle demultiplexor that relates each of the at least two different values for the rotation rates in a specific cycle to two different interferometer characteristics of the fiber optic gyroscope.

2. The fiber optic system according to claim 1, wherein the processing unit reduces the bias error (BF) of the fiber optic gyroscope by a linear combination of the at least two determined values ($\Omega_1$, $\Omega_2$) for the rotation rate and generates a corrected value ($\Omega_k$) for the rotation rate applied to the fiber optic gyroscope.

3. The fiber optic system according to claim 1, wherein the control device controls the evaluation unit such that at least two different working points of the fiber optic gyroscope are set by a corresponding control of the phase modulator.

4. The fiber optic system according to claim 3, further comprising:
   a unit for generating a dither amplitude that is suitable for setting at least two different values of the dither amplitude according to a signal of the control device, and
   a toggle control unit that is configured to determine the values of the working points of the fiber optic gyroscope in consecutive cycles and to control the values such that these values have a predetermined sequence.

5. The fiber optic system according to claim 3, further comprising:
   a unit to generate a modulation deviation to set at least two different values of the modulation deviation according to a signal of the control device, and
   a toggle control unit to determine the values of the working points of the fiber optic gyroscope in consecutive cycles and to control the values such that these values have a predetermined sequence.

6. The fiber optic system according to claim 1, wherein the control device controls at least one element of the group comprising the light source, the optical device having the phase modulator, the photo detector, and the amplifier such that at least two different interferometer characteristics of the fiber optic gyroscope are obtained by an according control of the element.

7. The fiber optic system according to claim 6, wherein the control device modulates a light source current to set at least two different powers of the light source, the control device comprises a toggle control unit to determine values of the light source power of the fiber optic gyroscope in consecutive cycles and to control the values such that these values have a predetermined sequence.

8. The fiber optic system according to claim 6, wherein the control device sets at least two different analog amplifications of the amplifier, the control device comprises a toggle control unit to determine the values of the analog amplification of the fiber optic gyroscope in consecutive cycles and to control the values such that these values have a predetermined sequence.

9. A method for operating a fiber optic system having a fiber optic gyroscope comprising:
   generating a light beam from a light source;
   splitting the light beam into two light beams by an optical device;
   modulating a phase at least one of the two light beams with a phase modulator to adjust a current working point of the fiber optic gyroscope;
   irradiating the two light beams in opposite directions into a fiber coil;
   unifying the two light beams leaving the fiber optic coil;
   generating an interference signal;
   converting the interference signal with a photo detector into an electrical signal that corresponds to a light intensity of the interference signal;
   amplifying the electrical signal with an amplifier;
   converting the electrical signal into a modulation signal with an analog/digital converter;
   resetting the interference signal according to the current working point of the fiber optic gyroscope;

determining a rotation rate of the fiber optic gyroscope;
determining at least two different values ($\Omega_1$, $\Omega_2$) for the rotation rate of the fiber optic gyroscope;
comparing the at least two different values of the rotation rate to determine a bias error; and
correcting the rotation rate of the fiber optic gyroscope based on the bias error,
wherein the at least two different values for the rotation rate are obtained by obtaining at least two different interferometer characteristics of the fiber optic gyroscope by a corresponding control of at least one element from the group comprising the light source, the optical device having the phase modulator, the photo detector, and the amplifier.

10. The method according to claim 9, further comprising reducing the bias error (BF) of the fiber optic gyroscope by a linear combination of the at least two determined values ($\Omega_1$, $\Omega_2$) for the rotation rate and a corrected value ($\Omega_k$) for the rotation rate applied to the fiber optic gyroscope is determined.

11. The method according to claim 9, wherein the at least two different values ($\Omega_1$, $\Omega_2$) for the rotation rate are obtained by setting at least two different working points of the fiber optic gyroscope by using a corresponding control of the phase modulator.

12. The method according to claim 11, further comprising generating a dither amplitude,
wherein the at least two different working points of the fiber optic gyroscope are set by at least two different values of the dither amplitude, wherein the values of the working points of the fiber optic gyroscope are set in consecutive cycles such that these values have a predetermined sequence, and
wherein the value determined for the rotation rate in a specific cycle is related to one of the at least two different working points of the fiber optic gyroscope.

13. The method according to claim 11, further comprising generating a modulation deviation,
wherein the at least two different working points of the fiber optic gyroscope are set by at least two different values of the modulation deviation, wherein the values of the working points of the fiber optic gyroscope in consecutive cycles are set such that these values have a predetermined sequence, and
wherein the value determined for the rotation rate in a specific cycle is related to one of the at least two different working points of the fiber optic gyroscope.

14. The method according to claim 9, wherein the at least two different interferometer characteristics of the fiber optic gyroscope are obtained by at least two different values of the light source power,
wherein the values of the light source power in consecutive cycles are set such that these values have a predetermined sequence, and
wherein the value determined in a specific cycle for the rotation rate is related to one of the at least two different interferometer characteristics of the fiber optic gyroscope.

15. The method according to claim 9, wherein the at least two different interferometer characteristics of the fiber optic gyroscope are obtained by at least two different values for the analog amplification of the amplifier,
wherein the values of the amplification in consecutive cycles are set such that these values have a predetermined sequence, and
wherein the value determined for the rotation rate in a specific cycle is related to one of the at least two different interferometer characteristics of the fiber optic gyroscope.

* * * * *